United States Patent [19]

Rosencwaig et al.

[11] 4,257,799
[45] Mar. 24, 1981

[54] METHOD FOR PRODUCING SMALL HOLLOW SPHERES

[75] Inventors: Allen Rosencwaig, Danville; Jackson C. Koo, San Ramon, both of Calif.; John L. Dressler, Spring Valley, Ohio

[73] Assignee: The United States of America as represented by the United States Department of Energy, Washington, D.C.

[21] Appl. No.: 61,167

[22] Filed: Jul. 26, 1979

[51] Int. Cl.$^3$ .............................................. C03B 3/04
[52] U.S. Cl. ........................................ 65/21.4; 65/22; 106/40 V; 264/43
[58] Field of Search ...................... 65/21, 22; 264/43; 106/40 V

[56] References Cited

U.S. PATENT DOCUMENTS

| | | | |
|---|---|---|---|
| 3,717,486 | 2/1973 | Fukumoto et al. | 264/43 X |
| 4,017,290 | 4/1977 | Budrick et al. | 65/21 |
| 4,133,854 | 1/1979 | Hendricks | 264/10 |

OTHER PUBLICATIONS

Laser Fusion Hollow Microspheres by Liquid-Droplet Method; Rosencwaig et al., 6-5-1978; preprint UCRL 81421.

Primary Examiner—Robert L. Lindsay, Jr.
Attorney, Agent, or Firm—L. E. Carnahan; Roger S. Geither; Richard G. Besha

[57] ABSTRACT

A method for producing small hollow spheres of glass having an outer diameter ranging from about 100μ to about 500μ with a substantially uniform wall thickness in the range of about 0.5–20μ. The method involves introducing aqueous droplets of a glass-forming solution into a long vertical drop oven or furnace having varying temperature regions. In one embodiment, one of the temperature regions is lower than both the preceeding region and the subsequent region. One region utilizes a temperature of at least 200° C. higher than the melting point of the glass-forming material in the solution and, for example, may be at least 3 times higher than the temperature of the preceeding region. In addition, there is a sharp temperature gradient between these regions. As each droplet of solution passes through a first region it forms into a gel membrane having a spherical shape and encapsulates the rest of the drop retained in the elastic outer surface and the water entrapped within diffuses rapidly through the thin gel membrane which causes more of the glass-forming material to go out of solution and is incorporated into the gel membrane causing it to grow in size and become hollow. The thus produced hollow glass sphere has a sphericity, concentricity, and wall uniformity of better than 5%. The sphere is capable of retaining material of up to at least 100 atmospheres therein over long periods of time. In one embodiment.

14 Claims, 2 Drawing Figures

METHOD FOR PRODUCING SMALL HOLLOW SPHERES

BACKGROUND OF THE INVENTION

The invention described herein arose under work at the Lawrence Livermore Laboratory in the course of, or under, Contract No. W-7405-Eng-48 between the University of California and the United States Department of Energy.

This invention relates to the production of small hollow glass spheres, and particularly to an improved method and apparatus for producing small hollow glass spheres of uniform thickness and diameter.

Hollow glass spheres of diameters up to about 500$\mu$ have a variety of applications, and are particularly useful in the fabrication of targets for implosion by inertial confinement systems, such as for small point sources of neutrons or x-rays, physics studies, diagnostic evaluations, and to produce a plasma for magnetic confinement fusion systems.

The basic target for laser implosion experiments, for example, is a hollow glass microsphere filled with 10–100 atmospheres of equimolar deuterium and tritium (DT). Current targets are usually about 100–300$\mu$ in diameter with wall thicknesses of from 0.5 to 20$\mu$, depending on the experiment being carried out and the available laser energy. The criteria for inertial confinement target microspheres are very stringent. Sphericity, concentricity, and wall uniformity all must be better than 5%, a specification that requires deviations of no more than 2000 Å for a 4$\mu$ thick wall. In addition, the surface finish must be better than 2000 Å. Finally, even the thin walled micropheres must hold up to at least 100 atmospheres of DT over long periods of time.

Until recently, the glass target microspheres were obtained by laborious sorting through large quantities of commercially produced microspheres. Such microspheres are fabricated primarily as a structural filler in suitable resin composite materials and were mass produced from glass frits or gels blown in gas flame furnaces. As such, the microspheres were fabricated without concern for the production of particularly high quality end products such as required for glass target microspheres. Thus, the number of microspheres found in this laborious sorting that met the above stringent criteria were few, and thus costly.

Recently a method and apparatus was developed for the production of small hollow spheres of glass wherein a glass-forming solution was mixed with a blowing agent which decomposes at a high temperature forming a gas which expands from within a drop of the solution to form a hollow sphere. The hollow sphere is formed as it passes through a multiple stage oven wherein each subsequent stage is at a higher temperature than its preceeding stage. U.S. Pat. No. 4,133,854 issued Jan. 9, 1979 in the name of C. D. Hendricks exemplifies this recent method and apparatus for producing glass microspheres capable os substantially meeting the above criteria for inertial confinement target applications.

To meet all the above requirements and to produce the glass microspheres at still lower costs, substantial effort is continuously being expended in the target fabrication field.

Therefore, it is an object of the invention to provide an improved method and apparatus for producing hollow glass spheres.

A further object of the invention is to provide an improved method for producing small hollow glass spheres of a uniform wall thickness and diameter.

Another object of the invention is to provide an improved method for producing hollow glass microspheres having a diameter of about 100–500$\mu$ and a wall thickness in the range of about 0.5$\mu$ to about 20$\mu$, and wherein a blowing agent may be utilized in or eliminated from the glass-forming solution.

Another object of the invention is to provide an improvement in the glass microsphere forming apparatus wherein a verticle, multiple region, controlled temperature oven is utilized having one region with a temperature significantly higher than the previous region.

Another object of the invention is to provide an improved method for producing hollow glass spheres wherein gel membranes are formed and collapsed in shape and without rupture to form the hollow spheres.

Another object of the invention is to provide an improved method for producing hollow glass spheres utilizing a multiple region oven wherein there is a sharp temperature gradient between two of the regions of the oven with one region having a temperature significantly higher than the preceeding region.

Another object of the invention is to provide an improved method and apparatus for producing hollow glass spheres of uniform wall thickness utilizing a multiple region oven wherein the first region has two temperature zones with the second zone being at a lower temperature than the first zone, and wherein the second region is at a temperature, under certain conditions, of about three times the temperature of the second zone of the first region.

Other objects of the invention will become readily apparent to those skilled in the art from the following description and accompanying drawings.

SUMMARY OF THE INVENTION

The present invention provides an improved method for fabricating higher quality glass microspheres than those produced by the method and apparatus described in above-referenced U.S. Pat. No. 4,133,854. The method of this invention is particularly applicable for forming glass microspheres having a diameter of about 100–350$\mu$ although microspheres up to about 500$\mu$ can be produced thereby. The improvement may utilize glass-forming solutions with or without a blowing agent. In the improved method one stage of the oven is at a substantially higher temperature (at least 200° C. higher than the melting point of the glass-forming material in the solution and, for example, on the order of three times the temperature of the previous stage depending on the composition of the solution) than the preceeding stage, with a sharp temperature gradient between these two stages. This results in a higher quality glass microsphere than that produced by the method of the above-referenced patent which does not utilize the significant temperature increase and gradient between these two stages. The present invention utilizes either a three (3) region or a four (4) region or zone vertical oven having specific lengths and temperatures in each region thereof. By controlling the glass-forming solution composition and the size of the liquid droplet passing through the multiple region vertical oven, and by cooling the temperature and transit time through each region of the oven, it is possible to control the diameter and wall thickness distributions of the resultant microspheres.

DETAILED DESCRIPTION OF THE INVENTION

Figure 1:
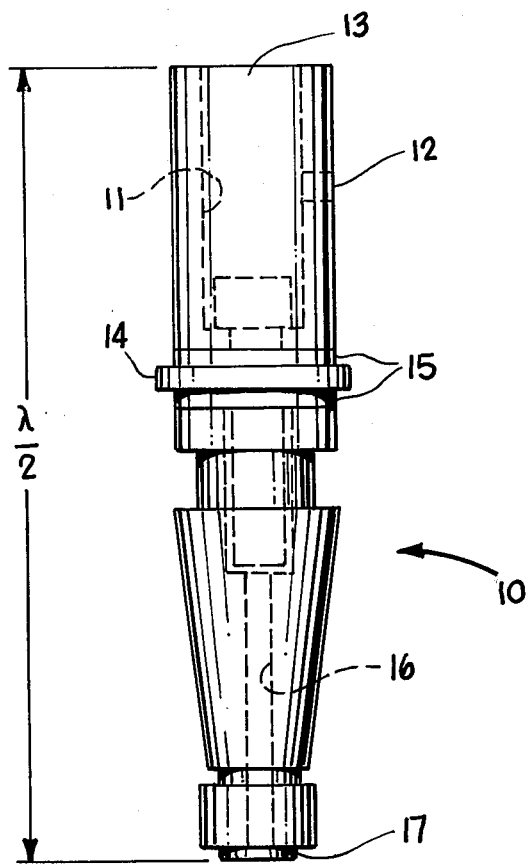
FIG. 1 is a schematic illustration of an embodiment of a liquid-droplet generator utilized in the FIG. 2 furnace.

The present invention is an improved method and apparatus for producing glass microspheres of uniform wall thickness and diameter. Basically the improvement provided by this invention over prior methods and apparatus, exemplified by above-referenced U.S. Pat. No. 4,133,854, is in the use of a multiple region oven wherein one region has a temperature significantly higher (about three times under certain conditions) than the preceeding region and has a sharp temperature gradient between these two regions. A blowing agent may or may not be utilized in the glass-forming solutions used in the multiple region oven. In one embodiment of the invention the temperature of a second zone of the first region may be lower than that of the first zone of that region and the temperature of the subsequent region is significantly higher (for example, at least 200° C. higher than the melting point of the glass-forming material in the solution) so as to produce a rapid and uniform transition from a gel membrane precursor to a glass microsphere. Also the sharp temperature gradient between the first and second regions produces significantly higher quality glass microspheres. As set forth hereinafter in detail, the stages of the process of producing a glass microsphere from a droplet of glass-forming solution are briefly as follows. In the first stage the droplet passes through an encapsulation and dehydration region composed of either a single or a two zone arrangement. In this region rapid vaporizaton of the water of the solution material from the outer surface of the droplet occurs, forming a gel membrane which encapsulates the remainder of the droplet. This is carried out in a first temperature zone (encapulation zone) if a two zone first region is used. As the droplet continues through this first region, water vapor diffuses rapidly through the thin gel membrane. As the water vapor diffuses out, more glassy material is added to the gel membrane, and due to the inner vapor pressure the gel membrane will expand and become large and hollow. This is carried out in a second temperature zone (dehydration zone) if a two zone first region is used. In the next stage, the transition region, which is the critical region of this process, the large hollow gel membrane collapses in shape without rupture due to the rapid increase in temperature and sharp temperature gradient, and transforms into a glass microsphere. The collapse must be rapid and uniform without total collapse of the spherical shape, and the microsphere thus formed is about ⅓ the size of the gel membrane. In the above-referenced patented process, the gel membrane does not uniformly collapse in the transition region but forms a non-uniform "raisin-like" configuration and is reformed by the re-expansion of the material. The next stage, the refining region, the glass microsphere is finished by the transition into glass of any remaining spots or areas of the gel membrane or precursor, with little further reduction in diameter. The thus formed glass microsphere then passes into a collection zone or region, as in the process exemplified by above-cited U.S. Pat. No. 4,133,854.

To provide a basic understanding of this invention, the basic principles of the liquid-droplet technique of forming glass microspheres are set forth as follows:

1. An aqueous solution can be made containing water-soluble glass-forming compounds, such as sodium silicate with or without a blowing agent.
2. A droplet of this solution will attain a highly spherical shape in free fall due to surface tension.
3. If the droplet is subjected to a high temperature during free fall, water vapor can be entrapped within the sphere as the glass-forming compounds transform into glass.
4. Under the proper conditions, the entrapped water vapor will act as an internal blowing agent when no blowing agent is utilized creating a hollow glass microsphere.
5. By appropriate selection of temperatures and droplet transit times, hollow glass microspheres with specified diameters and wall thicknesses can be produced in a controlled fashion.

To accurately control the geometric parameters of the glass microspheres, the aqueous droplets of glass-forming compounds or solutions are introduced into a long vertical drop furnace by means of a piezoelectrically driven droplet generator. By controlling the solution composition and the size of the orifice in the liquid droplet generator, it is possible to control the diameter and wall thickness distributions of the resultant microspheres.

The droplet generator produces droplets with a precisely controlled volume of an aqueous solution containing glass-forming oxides and may be constructed as in above-referenced U.S. Pat. No. 4,133,854, for example. Basically the generator consists of three major components: (1) the top component, a resonant stub which forms an ultrasonically stimulated jet, (2) the middle component, a charge ring which selectively charges newly-formed liquid drops, and (3) the bottom component, deflector and catcher electrodes which capture those droplets that are charged.

FIG. 1 schematically illustrates an embodiment of a liquid-droplet generator and inasmuch as the details of such do not constitute part of this invention, only a general description thereof is set forth. However, a more detailed description is found in report UCRL-81421 entitled "Laser Fusion Hollow Glass Microspheres by the Liquid-Droplet Method," by A. Rosencwaig et al., released for public distribution on July 28, 1978, and incorporated herein by reference. The inventors of this invention are also coauthors of the above referenced report. The FIG. 1 generator, generally indicated at 10 and having an overall length of $\lambda/2$, includes a reservoir 11 for the liquid glass-forming solution which is connected via an inlet port 12 to a liquid solution source, not shown, and is pressurized via a pressure transducer port 13. A transducer drive signal electrode 14 is located below reservoir 11 and having piezoelectric transducers 15 located on each side. The droplets fall through passage 16 and an orifice plate 17 into the vertical drop furnace, as shown in FIG. 1. As pointed out in the above-referenced patent, only the uncharged droplets pass into the vertical oven or furnace. During normal operation, for example, only one of every 8, 16, or 32 droplets is uncharged and thus most of the droplets formed are deflected and caught before entering the oven. This increases the spacing between the droplets in the oven, minimizing the chance of coalescing collision.

Figure 2:
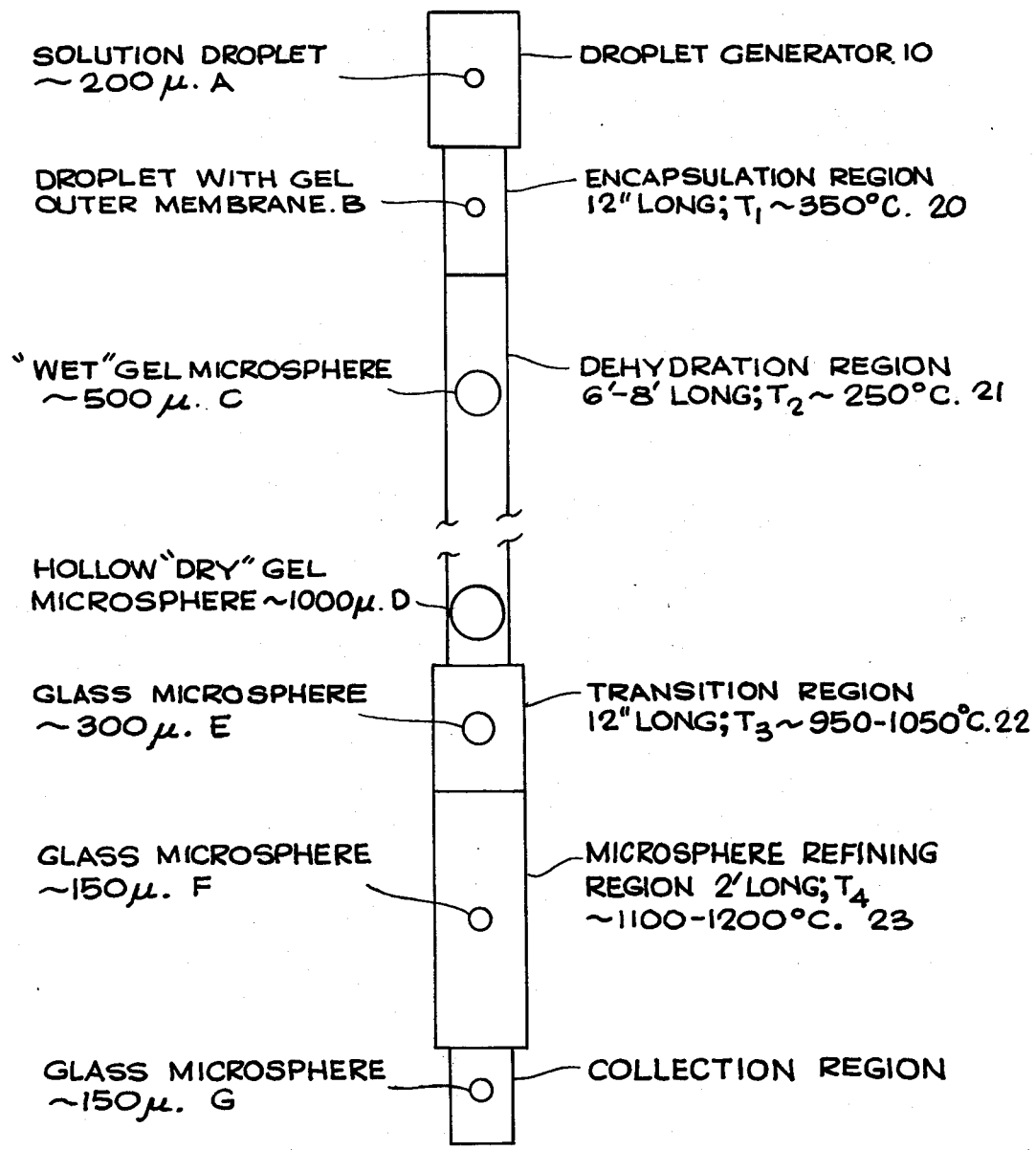
FIG. 2 is a schematic diagram of a preferred embodiment of a vertical-drop furnace incorporating four temperature regions in accordance with the invention.

FIG. 2 illustrates a vertical drop furnace, or oven, for carrying out the preferred embodiment of the method of invention and having a droplet generator mounted at the top thereof. For example, the furnace may consist of segments of quartz tubes 3 inches in diameter, ⅛ inch thick, joined together to form a total length of up to 16 feet, for example. The heating elements may consist of insulated heater strips and clam-shell multizone furnaces.

The vertical drop furnace of FIG. 2 can be considered to be composed of four distinct sections. The topmost section is the "insertion" section, where the droplet-generator 10 is situated. Below that is the "drying" section, consisting of an encapsulation region 20 and a dehydration region 21, having a length of 6–10 feet and maintained at temperatures of 200°–400° C. These two regions (20 and 21) may be combined into a single region as described in greater detail hereinbelow. The next section is the "fusing" section, consisting of a transition region 22 and a refining region 23, having a length of 3 feet and maintained at temperatures of 900°–1500° C. Finally, the bottom section is the "collector" section, including a collection region 24, having a length of 3 feet and connected to vacuum systems, etc. Here the hollow glass microspheres drop into a suitable container, and the furnace gases are drawn out in a controlled fashion through a vacuum vent.

The various heaters for the individual regions 20-23 may be driven by appropriate thermocouple-controlled power supplies, such as those taught in the above-referenced patent. The furnace is well sealed and insulated throughout the heated regions and the amount of air drawn into the furnace is carefully controlled by means of the vacuum vent in the collector section 24. The furnace normally operates under vacuum conditions, or at ambient atmospheric pressure, but may be pressurized if required. The lengths of the various regions 20-23 are established to provide the necessary transit times that the droplet must spend during the various stages of transformation into a hollow glass microsphere. The temperatures of each of the regions 20-23 are established to produce the necessary chemical reaction or transformation of the droplet material as it passes through the furnace. The vertical velocities of the droplet may range from about 500 cm/sec near the top to as low as about 5 cm/sec, if required, at the bottom of the "drying" section.

Since the creation of a hollow glass microsphere from a liquid droplet is a dynamic process occurring in a reasonably short time (on the order of a few seconds), and since the droplet is traveling through a long opaque furnace, direct observation of the processes that occur cannot be carried out. However, by means of extensive experimentation carried out in verification of the invention, the physical and chemical processes that take place are sufficiently understood, these being described in detail in above-cited report UCRL-81421.

The microsphere production begins with the preparation of a solution containing as its main ingredients for example, water and hydrated sodium silicate, and lesser amounts of boric acid, potassium hydroxide and lithium hydroxide.

The liquid-droplet technique requires the use of an aqueous solution of glass-forming oxides. Among the various glass-forming oxides, only the alkali oxides are water soluble to any significant degree. Of these the $Na_2O-SiO_2$ binary system most easily forms a glass at relatively low temperatures and has a lower viscosity at temperatures below 1200° C. The basic composition of the preferred binary system, for example, may be $Na_2O-SiO_2$ in the weight percent ratio of about 65% $SiO_2$ and about 21% $Na_2O$. Since this composition is close to the eutectic in the $Na_2O-SiO_2$ phase diagram, it has a low melting temperature and the effects of devitrification are minimized. Also, the low viscosity is essential to ensure high sphericity and concentricity of the microspheres.

Since pure $Na_2O-SiO_2$ is susceptible to weathering or deterioration due to the water in the atmosphere, glass network modifiers, such as $K_2O$ and $Li_2O$, and glass network formers, such as $B_2O_3$, are added. The network modifiers disrupt the continuity of the $SiO_2$ network thereby decreasing the melting point markedly from its value of 1600° C. for pure $SiO_2$. Network formers join the network structure of the pure silical glass, reducing the viscosity but not affecting the melting point significantly.

The network former $B_2O_3$ reduced the viscosity of the glass without adverse change in thermal expansion and durability. The network modifiers $K_2O$ and $Li_2O$ reduce the $Na^+$ ion mobility as a result of the lattice distortions created by the large $K^+$ ions and the much smaller $Li^+$ ions. Thus, the addition of $B_2O_3$, $K_2O$, and $Li_2O$ has little adverse effect on the low melting temperature and the low viscosity of the basic $Na_2O-SiO_2$ system, while considerably increasing the durability of the glass.

The best results have been obtained using aqueous solution of sodium silicate, boric acid, potassium hydroxide, and lithium hydroxide in the weight percents set forth in Table I, for solutions from which thin-walled ($<5\mu$) and thick-walled ($>5\mu$) microspheres are produced.

TABLE I

| Solutions for Liquid-Droplet System | |
|---|---|
| Thin-Wall Microspheres | Thick-Walled Microspheres |
| $H_2O$ - 75.0% (by weight) | $H_2O$ - 60.7% (by weight) |
| $Na_2O$ . 3.38, $SiO_2$ . 25, | $Na_2O$ . 3.38, $SiO_2$ . 25, |
| $H_2O$-23% | $H_2O$-35.9% |
| (Sodium Silicate) | (Sodium Silicate) |
| $H_3BO_3$ - 1.1% | $H_3BO_3$ - 1.9% |
| KOH - 0.8% | KOH - 1.4% |
| LiOH - 0.07% | LiOH - 0.1% |

From Table I it can be seen that the only major difference between the two solutions is the relative amount of water present, the thin-wall solution containing more water. In both cases, the relative composition of the glass-forming oxides in solution and in the final glass is found to be:

| Solution | Glass |
|---|---|
| $SiO_2$ - 66.3% (by weight) | 70.6% |
| $Na_2O$ - 22.7% | 21.9% |
| $B_2O_3$ - 2.9% | 2.0% |
| $K_2O$ - 8.0% | 5.4% |
| $Li_2O$ - 0.10% | 0.1% |

The composition of the resultant microspheres is somewhat different due to a reduced concentration of $Na_2O$ and the other alkaline oxides. This is the result of loss of some of the alkali due to vaporization in the hot "fusing" section of the drop furnace. Above-cited report UCRL-81421, page 19, describes the results of various experiments performed in which the composition of the above described aqueous solution was altered.

With the aqueous solution described above, which does not contain the addition of any blowing agent, the solution is then fed through the droplet generator and injected into the "drying" section of the oven or furnace of FIG. 2. The processes that occur during the transformation of the starting aqueous droplet to the final hollow glass microsphere are identified in the preferred embodiment as having four separate events: (1) encapsulation, (2) dehydration, (3) transition, and (4) refining. These four events are carried out in respective oven or furnace regions 20-23. Each of these four process events will be described hereinafter under separate headings.

(1) Encapsulation

The "drying" section of the furnce of FIG. 2 is divided into two distinct regions and temperature zones; namely the encapsulation and dehydration regions 20 and 21. However, as noted above and described below in greater detail, these two regions or zones may be combined into a single region. In the first or encapsulation region 20, the temperature ($T_1$) is in the range of 300°-400° C. (about 350° C. in FIG. 2) and has a length of 0.5-2 feet (12 inches in FIG. 2). In the second or dehydration region 21, the temperature ($T_2$) is in the range of 200°-300° C. (about 250° C. in FIG. 2) and has a length of 4-8 feet (6-8 feet in FIG. 2).

As a glass-forming solution droplet, indicated at A, having a diameter of about 50-350$\mu$ (about 200$\mu$ in FIG. 2), enters the encapsulation zone 20, a rapid vaporization of water occurs from the outer surface of the droplet. When the outer surface loses a sufficient amount of water, a skin or gel membrane forms, indicated at B. This gel membrane encapusulates the rest of the droplet in an elastic outer surface. It is important to achieve rapid encapsulation and, subsequently, rapid dehydration in order to ensure proper operation within a reasonable drop length. However if the temperature is too high in either the encapsulation of dehydration regions, the gel-encapsulated droplet or membrane will explode due to excessive water vapor pressure, and glass microspheres of the proper size will not be produced. If the temperature in the encapsulation region 20 is too low, encapsulation will result too far down the "drying" section of the furnace, and the gel membrane will not be sufficiently dehydrated for proper fusing into glass. It has been determined by experiments that, when using the above-described glass-forming solution, temperatures of 300°-400° C. in the encapsulation region 20 will ensure rapid encapsulation without explosion of the droplet.

(2) Dehydration

Once the droplet is encapsulated, the water vapor entrapped within diffuses rapidly through the thin gel membrane. The rate of water vapor production within the gel membrane is determined primarily by the temperature in the second or dehydration region 21 of the "drying" section of the furnace. It has been determined experimentally that, when using the above-desribed glass-forming solution, temperatures of 200°-300° C. (~250° C. in FIG. 2) ensure rapid dehydration of the gel capsule through the gel membrane, while preventing rupture of the membrane due to excess water vapor pressure. Since the gel membrane is very thin (about 2000 Å), and very weak at these temperatures, the rate of diffusion of vapor through the membsrane must closely equal the rate of vapor production within, so that only a few tenths of an atmosphere pressure are allowed to build up within the gel membrane.

As the water vapor diffuses out of the gel membrane, more of the glass-forming material, primarily sodium silicate, goes out of solution and is incorporated into the gel membrane. Under the action of the water vapor pressure within, the augmented membrane will increase its surface area and thus the gel membrane will grow in size and become hollow within, as indicated at C, to about 500$\mu$, for example. If the transit time in the dehydration region 21 of the "drying" section is long enough, the gel membrane emerging out of region 21 will be a large spherical hollow membrane or microsphere (about 1000$\mu$), as indicated at D, with an outer skin of about 1000 A thick. These gel membranes have been observed to be as large as 2 mm in diameter.

At the end of the dehydration region 21 the wall of the gel membrane D is quite hard and is not readily deformable. Thus even though there is now little or no excess pressure within, the gel membrane will not collapse on its own.

(3) Transition

Upon leaving the dehydration region 21, the gel membrane enters the transition region 22 which constitutes one of two regions in the "fusing" section of the furnace, the second region being the refining region 23. The transition region 22 is 6-12 inches long (12 inches in FIG. 2) and has a temperature ($T_3$) of 900°-1200° C. (about 950°-1050° C. in FIG. 2), an increase in temperature of 700°-900° (about 3 times higher) over that of dehydration region 21. The temperature of region 22 will vary depending on the composition of the glass-forming solution, but is preferably at least 200° C. over the melting point of the glass being formed. In this embodiment the region 22 temperature is about three (3) times higher than the temperature in region 21 with a sharp temperature gradient therebetween. The sharper the temperature gradient the better the process operates. The time in the transition region 22 is the most critical period in the process for it is here that the transformation to glass occurs. The two parameters that need to be controlled are the average temperature of the transition region and the transit rate through the transition region. As the temperature of the gel membrane reaches 800°-900° C. transformation to glass begins, the gel membrane wall turns to liquid, its viscosity drops, and the membrane begins to collapse due to surface tension since there is little to no excess pressure within the membrane. The collapse is partly offset by a buildup of some excess internal pressure due to a decreasing inner volume, and to the release of new water vapor and possibly other gases during the glass formation process. The collapse will slow down at the point when all the gel become glass, since at this point the viscosity of the fluid is much higher. Also, at this point, the rate of vapor loss via diffusion through the wall decsreases significantly as well, and this, in turn, also reduces the rate of collapse. The dimeter of the glass microsphere produced from the gel membrane, indicated at E in FIG. 2, is about ⅓ the diameter of the gel membrane D.

If the temperature in the transition region is too low, e.g. less than about 950° C. when forming spheres from the above-descsribed glass-forming solution, then the chemical reaction rate is low, and the collapse is slow. In this case, the collapse is nonuniform, and the spherical, concentric gel membrane becomes a highly distorted multicellular glass structure, or hollow spheres with concentricity defects or microspheres that have bubble defects in the wall. Preferably, the temperature in the transition region should not be less than 1000° C. for best results using the above-descsribed glass forming solution.

If the temperature in the transition region is too high, e.g., substantially more than 1200° C. when utilizing this solution, then collapse will be uniform but the collapse rate will be so high that many of the gel membranes will actually collapse to solid glass spheres before all the gel turns to glass.

Finally, by maintaining a transition region temperature in the range of 1000°–1200° C., large 1000μ gel membranes will collapse uniformly and without rupture to form spherical hollow glass microspheres with diameters in the range of about 200–400μ (300μ in FIG.2). These glass microspheres will emerge as high-quality hollow microspheres, which meet the above criteria for inertial confinement targets, after traversing the refining region 23.

In addition to the actual temperature of the transition region 22, the transit rate or time, or at least the time for the gel membrane to reach the transition temperature, is also an important parameter. The transit rate through region 22 is on the order of 1 second. This then implies that either the gel membranes enter the transition region 22 rapidly, or that the temperature gradient between the dehydration region 21 and the transition region 22 be very sharp. When this condition is met, the hollow gel membrane will tend to collapse uniformly to a spherical concentric hollow glass microsphere. The microsphere can be moved through the transition region at a faster speed by using a funnel through this region to decrease the cross-section and thereby increase the velocity. This would result in the gel membrane reaching the transition region at a faster speed and thereby increase the velocity, which results in the gel membrane reaching the transition temperature quickly. Also, special ovens, such as the gas jet oven or a very high temperature resistance oven, can be placed just at the transition point (between regions 21 and 22) to produce a sharp temperature gradient between the regions. It is thus seen that if the two parameters in the transition region, temperature and time, are properly controlled, the microsphere emerging from the transition region will be about ⅓ the size of the original gel membrane.

(4) Refining

Below the short transition region 22 is the refining region 23 having a length of 1–3 feet (2 feet in FIG. 2) and a temperature ($T_4$) at 1100°–1500° C. (about 1100°–1200° C. in FIG. 2). The main effect of the refining region 23 is to improve the quality of already fairly good microspheres produced in the transition region 22. Since all of the major size and quality parameters of the microspheres are essentially set by the conditions in the transition region, the refining region will not correct any significant defects in the microspheres.

At the high temperature of the refining region, the glass viscosity is low, and the action of surface tension thus ensures high sphericity of both inner ad outer wall surfaces. The gases and vapors trapped within the microsphere diffuse out at a rate determined by the glass composition and the tempeature, and the microsphere continues to collapse and becomes smaller as the excess internal pressure decreases. The collapse is quite gradual however, and in most cases the microsphere will decrease by no more than a factor of two during its transit through the refining region. As shown in FIG. 2, the diameter of the glass microsphere, indicated at F, is about ½ the diameter of microsphere E, i.e., reduced to about 150μ from about 300μ.

If the microsphere produced in the transition region 22 has fairly good concentricity, then transit through the refining region 23 will tend to improve this concentricity somewhat. However, the centering forces due to the inner movement of the microsphere wall are not very strong, and thus a highly non-concentric microsphere exiting from the transition region will not be improved significantly in the refining region 23. To achieve any significant improvement, the refining region would have to be considerably longer so as to allow more time for the weak centering forces to exert their effect.

In addition, the refining region 23 also serves to improve the quality of the microsphere walls. Here the chemical reactions come to completion and any pockets of incompletely reacted material within the wall now turn to glass and the wall become homogeneous. Also, any small bubbles that might have been trapped within the wall during the initial transformation in the transition region 22 will tend to diffuse out and disappear during passage through the refining region.

As shown in FIG. 2, glass microspheres, indicated at G, emerge from the refining region 23 and pass into collection region 24 wherein cooling and handling thereof commences. The collection region or section, for example, may be constructed as described in above-referenced U.S. Pat. No. 4,133,854.

Immediately after collection, the thus-formed glass microspheres are immersed in Freon, for example, to minimize contact with the atmosphere. As soon as possible thereafter, they are washed, for example, in a hot $HNO_3 + NH_4F$ etch which removes all reactive alkali and alkaline compounds from the surfaces thereof. This treatment has been shown effective in preventing noticeable surface deterioration for at least several weeks. Different glass-forming solution compositions may require different treatment of the formed microspheres. For longer viability, The microspheres, formed as above described, are either treated with appropriate glass passivating agents, such as a silane, or stored in a closed alcohol or Freon environment.

Glass microspheres with a diameter of about 100μ to about 350μ have been successfully produced from the above-described glass-forming solution in a controlled and routine manner by the above-described method of the present invention although microspheres up to a diameter of about 500μ can be produced. These microspheres can be readily produced with a substantially uniform wall thickness in the range of about 0.5 to 20μ. The microspheres are produced from not more than about 3 μgm of glass-forming solution. The diameter of the microspheres currently produced by the present method has been limited by the size and capability of the droplet generator and the vertical-drop furnace. With larger liquid-droplet generators and furnaces that can handle glass solution masses greater than 3 μgm per droplet, it is anticipated that larger diameter microspheres having uniformity of wall thickness and acceptable concentricity and sphericity can be produced utilizing the basic concept of this invention by adjustment of the temperature and time in the transition and refining regions of the furnace.

Above-mentioned report UCRL-81421 discusses in substantial detail areas such as surface chemistry, glass-forming solution composition studies, temperature studies, concentricity studies, test procedures, etc., carried out during verification of the invention and testing of the microspheres produced thereby.

The preferred embodiment of the invention as described above utilizes two different temperature zones or regions for carrying out the encapsulation and dehydration of the droplets in regions 20 and 21 of the FIG. 2 oven. These regions or temperature zones, as pointed out above, may be combined into a single region. However, when only a single region is utilized the length of the region must be increased and the temperature therein, for the glass-forming solution exemplified above, must be maintained in the 200°-300° C. range, preferably about 250° C. The additional length, about two to four feet, is required to allow sufficient time for the encapsulation and dehydration process to be carried out at this lower temperature. An increase of temperature in such a single region would result in excessive water vapor pressure which would cause the gel-encapsulated droplet or membrane to explode.

The critical feature of this invention, whether a single or two temperature drying region is used for the encapsulation and dehydration of the droplets, is in the transition region. Here a significantly higher temperature is utilized along with a sharp temperature gradient with respect to that of the preceeding region. This provides for the gel membranes to collapse in uniform spherical shape to produce higher quality spherical, hollow glass microspheres than produced by the process of the above-referenced patent.

It has thus been shown that the present invention provides a method for producing glass microspheres in the diameter range of about 100-500$\mu$ with a uniform wall-thickness in the range of about 0.5-20$\mu$, while having the required sphericity and concentricity for applications such as in inertial cofinement targets, utilized in physics studies or as neutrons sources, for example, as referenced above. The present invention provides a significant advance over the method described and claimed in above-referenced U.S. Pat No. 4,133,854 by: (1) elimination, if desired, of the addition of a separate component (a blowing agent) to the glass-forming solution, (2) utilizing a multiple region or zone furnace wherein, in the preferred embodiment, one of the region temperatures is lower than the preceeding region, (3) providing significant temperature increase (for example, three times) and a sharp temperature gradient between the "drying" and "fusing" sections of the furnace, and (4) controlling the temperature of and transit rate through the transition region of the multiple region furnace, so as to provide a uniform collapse in shape and without rupture of the gel membrane into a glass microsphere.

While, as pointed out above, the vertical velocities of the droplet may range from 5-500 cm/sec., the average velocity is on the order of 100 cm/sec. Thus, the total transit time may range from about 1-20 seconds, the average being about 4-8 seconds.

While particular apparatus and method parameters, materials, etc., have been illustrated and/or described, modifications will become apparent to those skilled in the art, and it is intended to cover in the appended claims all such modifications as come within the spirit and scope of the invention.

What we claim is:

1. In a method for producing hollow glass spheres having a diameter in the range of about 100$\mu$ to about 500$\mu$ and a substantially uniform wall thickness in the range of about 0.5$\mu$ to about 20$\mu$; the improvement comprising the steps of: forming droplets from a solution of silicate glass-forming materials; passing at least a portion of the thus formed droplets through a vertical furnace having at least three sequential temperature regions therein of about 200°-400° C., about 900°-1200° C., and about 1100°-1500° C., respectively; controlling the temperature of the regions of the furnace such that a second region has a tempeature of at least three times higher than the temperature of a preceding region and a sharp temperature gradient between the second region and the preceding region of the furnace, and controlling the transit rate of the forming hollow glass spheres through at least the second region.

2. The improvement defined in claim 1, additionally including the step of preparing the solution of silicate glass-forming material from 60.7-75.0% by weight of $H_2O$, 23.0-35.9% by weight of $Na_2O.3.38$ $SiO_2.25$ $H_2O$, 1.1-1.9% by weight of $H_3BO_3$, 0.8-1.4% by weight of KOH, and 0.7% -0.1% by weight of LiOH.

3. The improvement defined in claim 1, wherein the preceeding temperature region is composed of two temperature zones with a first of the zones having a temperature higher than a second of the two zones.

4. The improvement defined in claim 3, wherein the first temperature zone has a temperature in the range of about 300°-400° C., wherein the second temperature zone has a temperature in the range of about 200°-300° C.

5. The improvement defined in claim 4, wherein the transit rate of a forming microsphere through the second region is on the order of a few seconds.

6. The improvement defined in claim 4, additionally including the step of forming the multiple furnace regions such that the first temperature zone of the preceding region has a length of about 0.5 to 2 feet, wherein the second temperature zone of the preceding region has a length of about 4 to 8 feet, wherein the second region has a length of about 0.5 to 1 foot, and wherein the third region has a length of about 1 to 3 feet.

7. The improvement defined in claim 6, wherein the first temperature zone has a length of about 1 foot and a temperature of about 350° C., wherein the second temperature zone has a length of about 6-8 feet and a temperature of about 250° C., wherein the second region has a length of about 1 foot and a temperature of about 950°-1050° C., and wherein the third region has a length of about 2 feet and a temperature of about 1100°-1500° C.

8. The improvement defined in claim 1, additionally including the steps of immersing formed microspheres in a selected material to minimize contact thereof with the atmosphere, and washing the microspheres in an etch of selected materials 9. The improvement defined in claim 8, whereinthe formed microspheres are immersed in Freon and washed in an etch of hot $HNO_3 + NH_4F$.

10. The improvement defined in claim 8, additionally including the step of treating the washed microspheres with a glass passivating agent.

11. The improvement defined in claim 8, additionally including the step of storing the washed microspheres in a closed environment of alcohol or Freon.

12. The improvement defined in claim 1, additionally including the step of preparing the solution of silicate glass-forming materials from water, hydrated sodium silicate, boric acid, potassium hydroxide and lithium hydroxide.

13. The improvement defined in claim 1, additionally including the step of preparing the solution of silicate glass-forming materials from $H_2O$, a binary $Na_2O$-$SiO_2$ system modified by the addition of a glass network modifier which decreases the melting point of the $SiO_2$ and by a glass network former which reduces the viscosity without significantly affecting the melting point of the $Na_2O$-$SiO_2$ system.

14. The improvement defined in claim 13, wherein the glass network modifier is composed of $K_2O$ and $Li_2O$, and wherein the glass network former is composed of $B_2O_3$.

* * * * *